June 16, 1931. C. L. KUCHA 1,810,081
MOWER GUARD
Filed Oct. 11, 1927
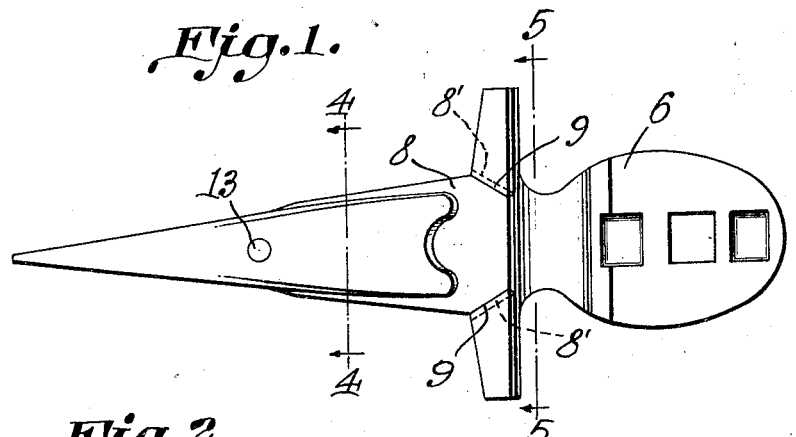
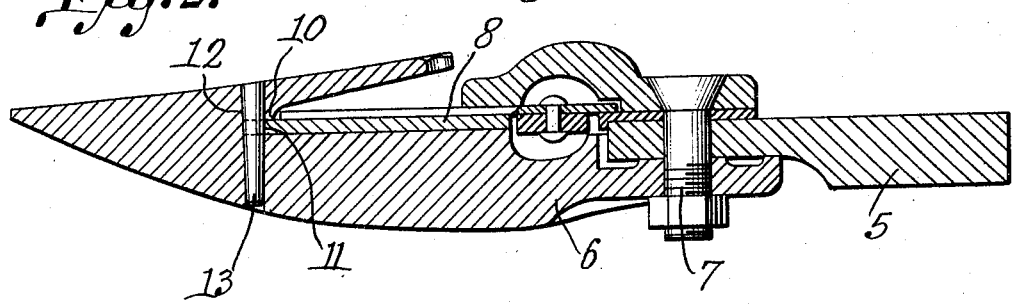
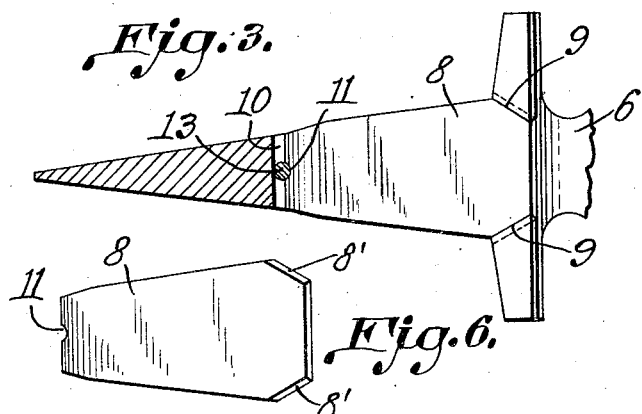
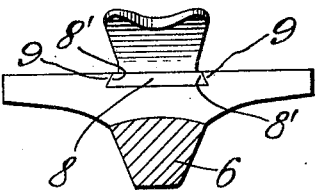
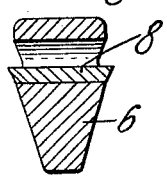
Charles L. Kucha Inventor Patented June 16, 1931

1,810,081

UNITED STATES PATENT OFFICE

CHARLES L. KUCHA, OF ARTESIAN, SOUTH DAKOTA

MOWER GUARD

Application filed October 11, 1927. Serial No. 225,558.

This invention has reference to mowing machines and more particularly to the construction of the mower guards and ledger plates supported thereby.

The primary object of the invention is to provided means whereby the ledger plates may be readily and easily removed for sharpening or repair, and replaced with facility, by persons unfamiliar with mechanics.

Another important object of the invention is to provide a device of this character which will securely lock the ledger plates in position, at all times, eliminating any possibility of accidental displacement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a mower guard equipped with a ledger plate mounted in accordance with the invention.

Figure 2 is a longitudinal sectional view through the guard and ledger plate.

Figure 3 is a fragmental sectional view taken through the upper portion of the guard directly above the ledger plate.

Figure 4 is a sectional view taken on line 4—4 of Figure 1.

Figure 5 is a sectional view taken on line 5—5 of Figure 1.

Figure 6 is a plan view of the ledger plate.

Referring to the drawings in detail, the reference character 5 designates the usual cutter bar of a mowing machine to which the mower guard 6 is connected, as by means of the bolt 7, it being understood that only one mower guard and ledger plate of a mower is shown herein.

The upper surface of the mower guard is cut away in the usual manner to receive the ledger plate, which in the present showing is indicated by the numeral 8, there being provided obliquely disposed shoulders 9 formed on the guard.

The ledger plate has its rear corners cut away as at 8' and beveled to correspond to the shape of the shoulders 9 so that when the ledger plate is positioned under the shoulders 9, the ledger plate will be held against vertical movement.

The forward end of the ledger plate extends into the cut out portion 10 at the forward end of the mower guard, where it is provided with a semi-circular cut out portion 11, which cut out portion 11 aligns with a vertical tapered opening 12 formed in the mower guard.

Extending into the opening 12 is a tapered locking pin 13 that is tapered downwardly and designed to be driven from the upper surface of the mower guard, to the end that a wedging action is set up between the pin 13 and wall of the opening in which it is positioned, to lock the ledger plate against movement, and at the same time, moving the ledger plate to closely engage the shoulders 9.

From the foregoing it will be seen that should it be desired to remove the ledger plate to sharpen or repair the same, it is only necessary to drive the securing pin from the tapered opening in which it is positioned, whereupon the ledger plate may be moved forwardly to disengage the shoulders 9. It follows that the ledger plate may now be lifted from the mower guard and repaired, or replaced by a new ledger plate.

It will be seen that repairs to a mower when equipped with ledger plates and mower guards constructed in accordance with the invention, may be readily and easily repaired by persons unfamiliar with mechanics.

I claim:

In a mower guard, a body portion having undercut shoulders formed adjacent to the inner end thereof, a ledger plate having beveled edges at the rear end thereof and adapted to engage the undercut shoulders to secure the ledger plate on the body portion, said ledger plate having a cut out portion formed in the forward edge thereof, said body portion having a tapered opening extending vertically therethrough and registering with the cut out portion of the ledger plate, and a tapered pin positioned in the opening and engaging within the cut out portion of the ledger plate for forcing the inclined edges of the ledger plate into close engagement with the undercut shoulders of the body portion.

In testimony that I claim the foregoing as my own I have hereto affixed my signature.

CHARLES L. KUCHA.